(12) United States Patent
Im et al.

(10) Patent No.: US 10,718,971 B2
(45) Date of Patent: Jul. 21, 2020

(54) DISPLAY DEVICE

(71) Applicant: Samsung Display Co., Ltd., Yongin-Si, Gyeonggi-Do (KR)

(72) Inventors: Hyundeok Im, Seoul (KR); Jaewoong Kang, Jeonju-si (KR); Jonghyuk Kang, Suwon-si (KR); Daehyun Kim, Hwaseong-si (KR); Jaebyung Park, Seoul (KR); Hyunmin Cho, Seoul (KR); Sung-jin Hong, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 453 days.

(21) Appl. No.: 15/490,111

(22) Filed: Apr. 18, 2017

(65) Prior Publication Data
US 2017/0299905 A1    Oct. 19, 2017

(30) Foreign Application Priority Data

Apr. 19, 2016    (KR) .................. 10-2016-0047784

(51) Int. Cl.
*G02F 1/13357*    (2006.01)
*G02F 1/1335*    (2006.01)
*G02F 1/1368*    (2006.01)

(52) U.S. Cl.
CPC ...... *G02F 1/1336* (2013.01); *G02F 1/133514* (2013.01); *G02F 1/133536* (2013.01); *G02F 1/1368* (2013.01); *G02F 1/133617* (2013.01); *G02F 2001/133521* (2013.01); *G02F 2001/133531* (2013.01); *G02F 2001/133614* (2013.01)

(58) Field of Classification Search
CPC ... G02F 1/133533; G02F 2001/133614; G02F 1/133617; G02F 2001/133521; G02F 1/133536; G02F 1/1336; G02F 1/133514
See application file for complete search history.

(56) References Cited

U.S. PATENT DOCUMENTS

| 2009/0213096 | A1* | 8/2009 | Kuo ...................... G06F 3/044 345/176 |
| 2014/0009964 | A1 | 1/2014 | Dubrow et al. |
| 2014/0176413 | A1* | 6/2014 | Jung ................. G02F 1/133514 345/102 |

FOREIGN PATENT DOCUMENTS

| JP | 2004004764 A | 1/2004 |
| KR | 1020050040855 A | 5/2005 |
| KR | 100676886 B1 | 2/2007 |

* cited by examiner

*Primary Examiner* — Michael H Caley
*Assistant Examiner* — Mariam Qureshi
(74) *Attorney, Agent, or Firm* — Cantor Colburn LLP

(57) ABSTRACT

A display device includes a display panel including a lower substrate, a resonance unit disposed on the lower substrate, a pixel disposed on the resonance unit, and a polarizing plate disposed on the pixel and having a first polarization axis, where the pixel includes a first sub pixel which displays a first color and a second sub pixel which displays a second color different from the first color, and a backlight unit disposed below the display panel and which supplies backlight to the display panel where the resonance unit includes a first optical cavity having a first resonance frequency corresponding to the first color and a second optical cavity having a second resonance frequency corresponding to the second color.

18 Claims, 11 Drawing Sheets

DISPLAY DEVICE

This application claims priority to Korean Patent Application No. 10-2016-0047784, filed on Apr. 19, 2016, and all the benefits accruing therefrom under 35 U.S.C. § 119, the content of which in its entirety is herein incorporated by reference.

BACKGROUND

1. Field

Exemplary embodiments of the invention herein relate to a display device having an improved color reproducibility.

2. Description of the Related Art

Recently, various display devices such as a liquid crystal display ("LCD"), an organic light emitting display ("OLED"), an electro wetting display device, a plasma display panel ("PDP"), and an electrophoretic display device are being developed. Such display devices are used for various electronic devices such as smartphones, digital cameras, notebook computers, and navigations.

The LCD device displays images by controlling polarizing plates orthogonal to each other and the arrangement of liquid crystal molecules disposed between the polarizing plates through an electric field. Pixels of the LCD device may display the three primary colors through red, green, and blue sub pixels. Red, green, and blue color filters may be disposed on the red, green, and blue sub pixels, respectively.

SUMMARY

Exemplary embodiments of the invention provide a display device having an improved color reproducibility.

An exemplary embodiment of the invention provides a display device including a display panel including a lower substrate, a resonance unit disposed on the lower substrate, a pixel disposed on the resonance unit, and a polarizing plate disposed on the pixel and having a first polarization axis, where the pixel includes a first sub pixel which displays a first color and a second sub pixel which displays a second color different from the first color, and a backlight unit which is disposed below the display panel and supplies backlight to the display panel, where the resonance unit includes a first optical cavity disposed between the first sub pixel and the backlight unit, including a first reflective polarization unit having a second polarization axis perpendicular to the first polarization axis and a first facing reflective unit facing the first reflective polarization unit, and having a first resonance frequency corresponding to the first color, and a second optical cavity disposed between the second sub pixel and the backlight unit, including a second reflective polarization unit having the second polarization axis and a second facing reflective unit facing the second reflective polarization unit, and having a second resonance frequency corresponding to the second color.

In an exemplary embodiment, each of the first and second facing reflective units may have a third polarization axis different from the second polarization axis.

In an exemplary embodiment, an angle between the third polarization axis and the second polarization axis may be an acute angle.

In an exemplary embodiment, a first resonance distance defined between the first reflective polarization unit and the first facing reflective unit may be equal to a second resonance distance defined between the second reflective polarization unit and the second facing reflective unit.

In an exemplary embodiment, the first optical cavity may further include a first dielectric layer disposed between the first reflective polarization unit and the first facing reflective unit, the second optical cavity may further include a second dielectric layer disposed between the second reflective polarization unit and the second facing reflective unit, and a first refractive index of the first dielectric layer may be different from a second refractive index of the second dielectric layer.

In an exemplary embodiment, $2 \cdot n_1 \cdot f_1 \cdot L = m \cdot c$ and $2 \cdot n_2 \cdot f_2 \cdot L = m \cdot c$ may be satisfied where $n_1$ is the first refractive index, $n_2$ is the second refractive index, $f_1$ is the first resonance frequency, $f_2$ is the second resonance frequency, m is a natural number greater than or equal to 1, c is the speed of light in vacuum, and L is the first and second resonance distances.

In an exemplary embodiment, the first optical cavity may further include a first dielectric layer disposed between the first reflective polarization unit and the first facing refractive unit, the second optical cavity may further include a second dielectric layer disposed between the second reflective polarization unit and the second facing refractive unit, and a first refractive index of the first dielectric layer may be equal to a second refractive index of the second dielectric layer.

In an exemplary embodiment, a first resonance distance defined between the first reflective polarization unit and the first facing reflective unit may be different from a second resonance distance defined between the second reflective polarization unit and the second facing reflective unit.

In an exemplary embodiment, $2 \cdot n \cdot f_1 \cdot L_1 = m \cdot c$ and $2n \cdot f_2 \cdot L_2 = m \cdot c$ may be satisfied where n is first and second refractive indexes, $f_1$ is the first resonance frequency, $f_2$ is the second resonance frequency, m is a natural number greater than or equal to 1, c is the speed of light in vacuum, $L_1$ is the first resonance distance, and $L_2$ is the second resonance distance.

In an exemplary embodiment, the first optical cavity may include a first color conversion layer which converts the backlight to a first color light having the first color.

In an exemplary embodiment, the first optical cavity may further include two first dielectric layers disposed between the first reflective polarization unit and the first facing reflective unit, where the first dielectric layers face each other with the first color conversion layer therebetween.

In an exemplary embodiment, a sum of thicknesses of the first dielectric layers and the first color conversion layer may be substantially equal to a resonance distance of the first resonance frequency.

In an exemplary embodiment, the second optical cavity may include a second color conversion layer which converts the backlight to a second color light having the second color.

In an exemplary embodiment, each of the first and second facing reflective units may be a semi-transparent layer.

In an exemplary embodiment, the first and second reflective polarization units may be disposed between the first and second facing reflective units and the lower substrate.

In an exemplary embodiment, the pixel may further include a third sub pixel which displays a third color, where the resonance unit is disposed between the third sub pixel and the backlight unit, includes a third reflective polarization unit having the second polarization axis and a third facing reflective unit facing the third reflective polarization unit, and further includes a third optical cavity having a third resonance frequency corresponding to the third color.

In an exemplary embodiment of the invention, a display device includes a display panel including a polarizing plate having a first polarization axis, a pixel disposed on the polarizing plate, a resonance unit disposed on the pixel, and an upper substrate disposed on the resonance unit, where the pixel includes a first sub pixel which displays a first color and a second sub pixel which displays a second color different from the first color, and a backlight unit which is disposed below the display panel and supplies backlight to the display panel, where the resonance unit includes a first optical cavity disposed between the first sub pixel and the upper substrate, including a first reflective polarization unit having a second polarization axis perpendicular to the first polarization axis and a first facing reflective unit facing the first reflective polarization unit, and having a first resonance frequency corresponding to the first color, and a second optical cavity disposed between the second sub pixel and the upper substrate, including a second reflective polarization unit having the second polarization axis and a second facing reflective unit facing the second reflective polarization unit, and having a second resonance frequency corresponding to the second color.

In an exemplary embodiment, each of the first and second facing reflective units may include a third polarization axis different from the second polarization axis.

In an exemplary embodiment, the first optical cavity may include a first color conversion layer which converts the backlight to a first color light having the first color.

In an exemplary embodiment, each of the first and second facing reflective units may be a semi-transparent layer.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
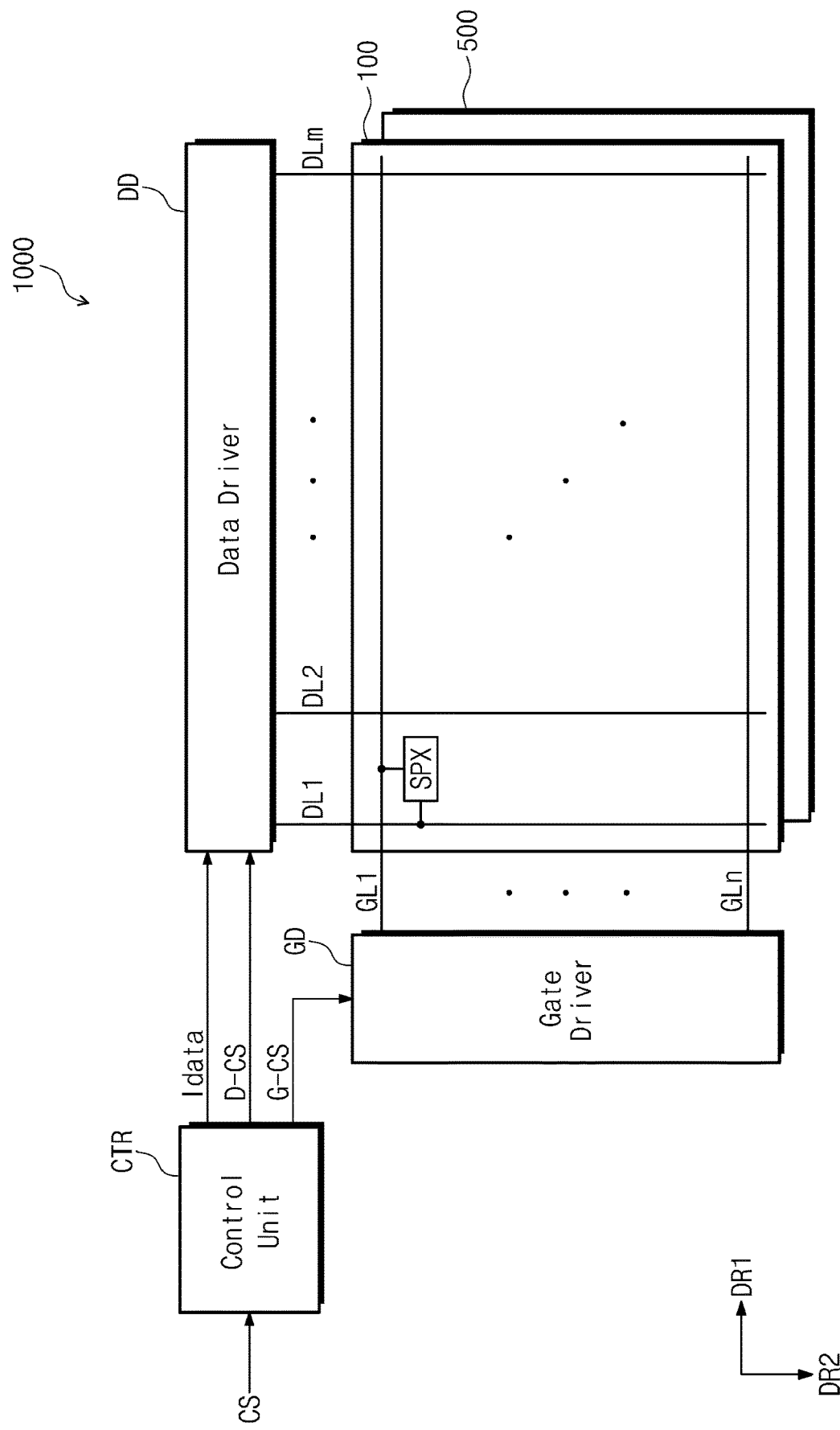
FIG. 1 is a simple block diagram illustrating an exemplary embodiment of a display device according to the invention.

Various modifications are possible in various embodiments of the invention and specific embodiments are illustrated in drawings and related detailed descriptions are listed. However, this does not limit various embodiments of the invention to a specific embodiment and it should be understood that the invention covers all the modifications, equivalents, and/or replacements of this invention provided they come within the scope of the appended claims and their equivalents. Additionally, parts not relating to the invention are omitted from the drawings in order to clearly describe the invention and like reference numerals refer to like elements throughout.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a simple block diagram illustrating a display device according to an exemplary embodiment of the invention.

Referring to FIG. 1, a display device 1000 according to an exemplary embodiment of the invention includes a display panel 100 for displaying an image and a panel driving unit for driving the display panel 100. The panel driving unit may include a gate driver GD, a data driver DD, and a control unit CTR for controlling the driving of the gate driver GD and the data driver DD.

The control unit CTR receives a plurality of control signals CS from the outside. The control unit CTR generates a data control signal D-CS (for example, an output start signal, a parallel start signal, and so on) and a gate control signal G-CS (for example, a vertical start signal, a vertical clock signal, and a vertical clock bar signal) on the basis of the plurality of controls signals CS. The data control signal D-CS is provided to the data driver DD and the gate control signal G-CS is provided to the gate driver GD.

The gate driver GD outputs gate signals sequentially in response to the gate control signal G-CS provided from the control unit CTR. The outputted gate signals are applied to the display panel 100.

The data driver DD receives output image data Idata from the control unit CTR. The data driver DD converts the output image data Idata into data voltages and outputs them in response to the data control signal D-CS provided from the control unit CTR. The outputted data voltages are applied to the display panel 100.

The display panel 100 includes a plurality of gate lines GL1 to GLn, a plurality of data lines DL1 to DLm, and a plurality of sub pixels.

Only one sub pixel SPX among a plurality of sub pixels is shown in FIG. 1 and the remaining sub pixels are omitted.

The gate lines GL1 to GLn extend along a first direction DR1 and are arranged in a second direction DR2. The data lines DL1 to DLm intersect the gate lines GL1 to GLn and insulate from them. In an exemplary embodiment, the data lines DL1 to DLm extend along the second direction DR2 and are arranged in the first direction DR1, for example. The first and second directions DR1 and DR2, for example, may be perpendicular to each other.

The sub pixels SPX are arranged in a matrix along the first and second directions DR1 and DR2.

The plurality of sub pixels SPX may be defined as one pixel. Each pixel is displayed and the resolution of the display panel 100 may be determined according to the number of the pixels provided in the display panel 100.

In an exemplary embodiment, three sub pixels SPX may be defined as one pixel, for example. However, the invention is not limited thereto, and in other exemplary embodiments, two, four, or more sub pixels SPX may be defined as the pixel.

The sub pixels SPX are connected to a corresponding data line among the data lines DL1 to DLm and connected to a corresponding gate line among the gate lines GL1 to GLn.

The display device 1000 includes a backlight unit 500. The backlight unit 500 generates backlight. The backlight unit 500 is disposed at the rear of the display panel 100 and supplies the backlight to the rear of the display panel 100.

Figure 2:
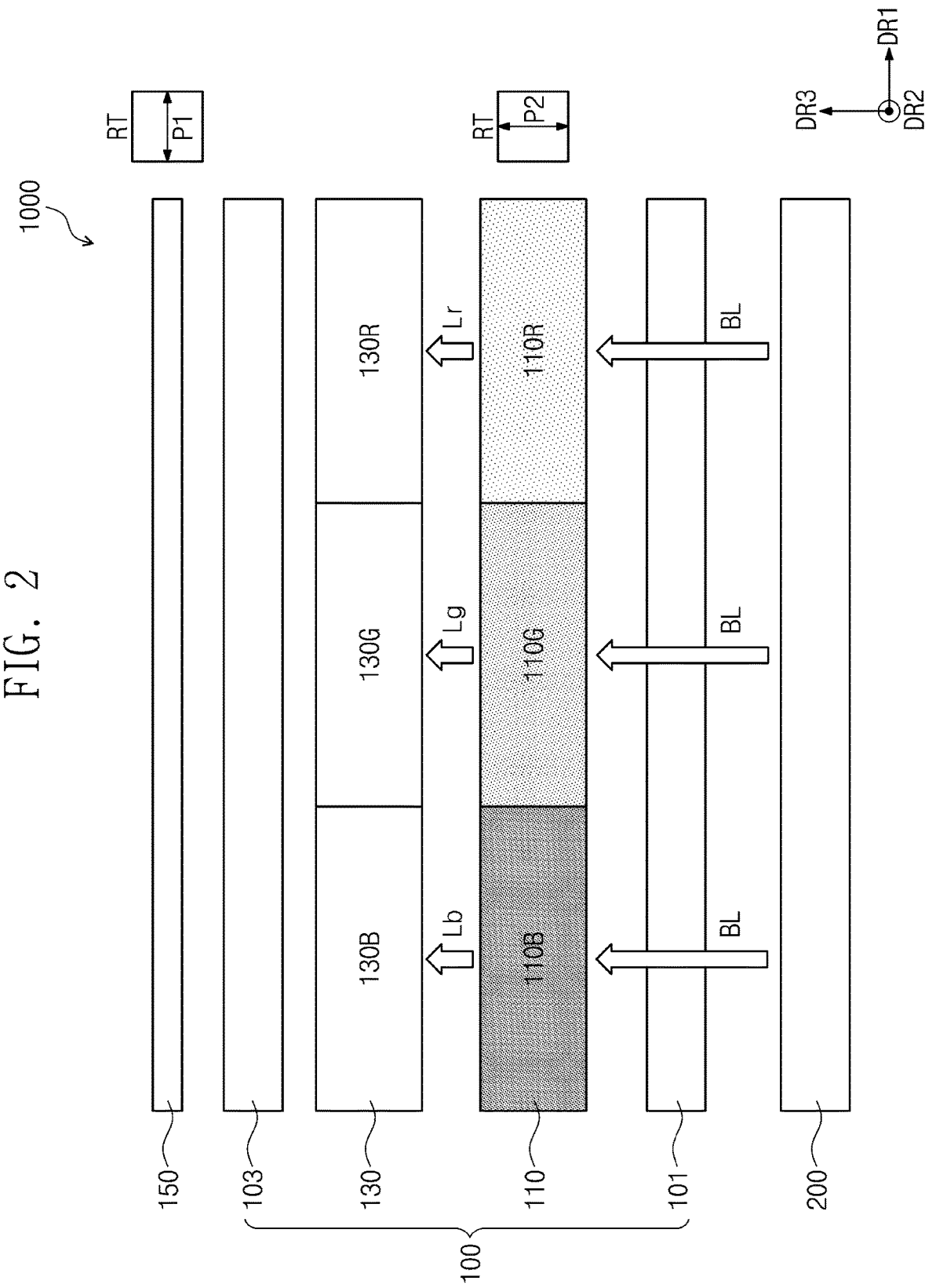
FIG. 2 is a sectional view of an exemplary embodiment of a display device according to the invention.

FIG. 2 is a sectional view of a display device according to an exemplary embodiment of the invention.

In FIG. 2, for convenience of description, a sectional view of an area corresponding to three sub pixels is shown.

Referring to FIG. 2, the display panel 100 includes a lower substrate 101, a resonance unit 110, a pixel 130, an upper substrate 103, and a polarizing plate 150.

According to an exemplary embodiment of the invention, the lower substrate 101, the resonance unit 110, the pixel 130, the upper substrate 103, and the polarizing plate 150 may be disposed along a third direction DR3 in the order of the lower substrate 101/the resonance unit 110/the pixel 130/the upper substrate 103/the polarizing plate 150. The third direction DR3 may be defined in a direction perpendicular to the first and second directions DR1 and DR2.

The lower substrate 101 and the upper substrate 103 are transparent and, for example, may include glass or a flexible polymer, and may be rigid or flexible.

The polarizing plate 150 may have a first polarization axis P1. According to an exemplary embodiment of the invention, the first polarization axis P1 may be parallel to the first direction DR1. In this specification, when a polarization axis or an optical linear polarization direction is shown in the drawing, the polarization axis or the optical linear polarization direction may be represented by an arrow defined in a polarization plane RT. In this case, for convenience of illustration, the polarization plane RT represents a portion of a plane parallel to the first and second directions DR1 and DR2, and an arrow defined in the polarization plane RT may represent a polarization axis parallel to the polarization plane RT or an optical linear polarization direction.

The backlight unit 200 is disposed at a lower side of the lower substrate 101. According to an exemplary embodiment of the invention, the backlight unit 200 may generate backlight, output the backlight to an upper side, and supply backlight BL to the entire surface of the rear of the lower substrate 101. According to an exemplary embodiment of the invention, the backlight BL may be white light. According to an exemplary embodiment of the invention, the backlight unit 200 may include a white light emitting diode ("LED") for generating white light.

According to an exemplary embodiment of the invention, the resonance unit 110 is an in-cell type. The resonance unit 110 may be disposed in the display panel 100 and may be disposed between the lower and upper substrates 101 and 103.

According to an exemplary embodiment of the invention, the resonance unit 110 may include a plurality of optical cavities. According to an exemplary embodiment of the invention, the resonance unit 110 may include three optical cavities having different resonance frequencies. Each of the optical cavities includes two reflection surfaces that resonate the light of a specific frequency (or wavelength) and are disposed being spaced by a resonance distance according to a resonance frequency.

According to an exemplary embodiment of the invention, the three optical cavities may be first to third optical cavities 110B, 110G, and 110R. The first to third optical cavities 110B, 110G, and 110R may be arranged along the first direction DR1. According to an exemplary embodiment of the invention, the first to third optical cavities 110B, 110G, and 110R may be arranged along the first direction DR1.

The first to third optical cavities 110B, 110G, and 110R may have different resonance frequencies. That is, the frequency of a light, which is resonated in the first to third optical cavities 110B, 110G, and 110R, may be different. In more detail, each of the first to third optical cavities 110B, 110G, and 110R receives the backlight BL that penetrates the lower substrate 101, resonates the backlight BL by each resonance frequency, and outputs only the light resonated at each resonance frequency to the upper side.

According to an exemplary embodiment of the invention, the first optical cavity 110B receives the backlight BL, resonates blue light Lb in the components of the backlight BL, outputs the blue light Lb to an upper side, and supply the blue light Lb to the pixel 130. Components other than the blue light Lb in the components of the backlight BL incident to the first optical cavity 110B may be cancelled out by destructive interference.

In a similar manner, the second optical cavity 110G receives the backlight BL, resonates green light Lg in the components of the backlight BL, outputs the green light Lg to an upper side, and supply the green light Lg to the pixel 130. Components other than the green light Lg in the components of the backlight BL incident to the second optical cavity 110G may be cancelled out by destructive interference.

In a similar manner, the third optical cavity 110R receives the backlight BL, resonates red light Lr in the components of the backlight BL, outputs the red light Lr to an upper side, and supply the red light Lr to the pixel 130. Components other than the red light Lr in the components of the backlight BL incident to the third optical cavity 110R may be cancelled out by destructive interference.

According to an exemplary embodiment of the invention, the backlight BL may be unpolarized light. The first to third optical cavities 110B, 110G, and 110R may linearly polarize the blue, green, and red lights Lb, Lg, and Lr, respectively, in the second direction DR2. According to an exemplary embodiment of the invention, a reflective polarization unit including the second polarization axis P2 parallel to the second direction DR2 may be included. The reflective polarization unit is described later.

According to an exemplary embodiment of the invention, the pixel 130 may include the three sub pixels SPX (refer to FIG. 1). The three sub pixels SPX may be a blue sub pixel 130B, a green sub pixel 130G, and a red sub pixel 130R. In this specification, the blue sub pixel 130B, the green sub pixel 130G, and the red sub pixel 130R may be referred to as first to third sub pixels, respectively.

The blue sub pixel 130B, the green sub pixel 130G, and the red sub pixel 130R may be arranged along the first direction DR1. According to an exemplary embodiment of the invention, the blue sub pixel 130B, the green sub pixel 130G, and the red sub pixel 130R may be arranged along the first direction DR1. According to an exemplary embodiment of the invention, the blue sub pixel 130B, the green sub pixel 130G, and the red sub pixel 130R may be disposed on the first to third optical cavities 110B, 110G, and 110R, respectively.

The blue sub pixel 130B may receive the blue light Lb from the first optical cavity 110B, and modulate the blue light Lb based on the received data voltage to display blue color (or blue color image).

The green sub pixel 130G may receive the green light Lg from the second optical cavity 110G, and modulate the green light Lg based on the received data voltage to display green color (or green color image).

The red sub pixel 130R may receive the red light Lr from the third optical cavity 110R, and modulate the red light Lr based on the received data voltage to display red color (or red color image).

According to exemplary embodiments of the invention, the number of sub pixels included in the pixel 130 is not limited to three and may be two or more than four. Additionally, in correspondence thereto, the number of optical cavities included in the resonance unit 110 is not limited to three and may be two or more than four.

Figure 3A:
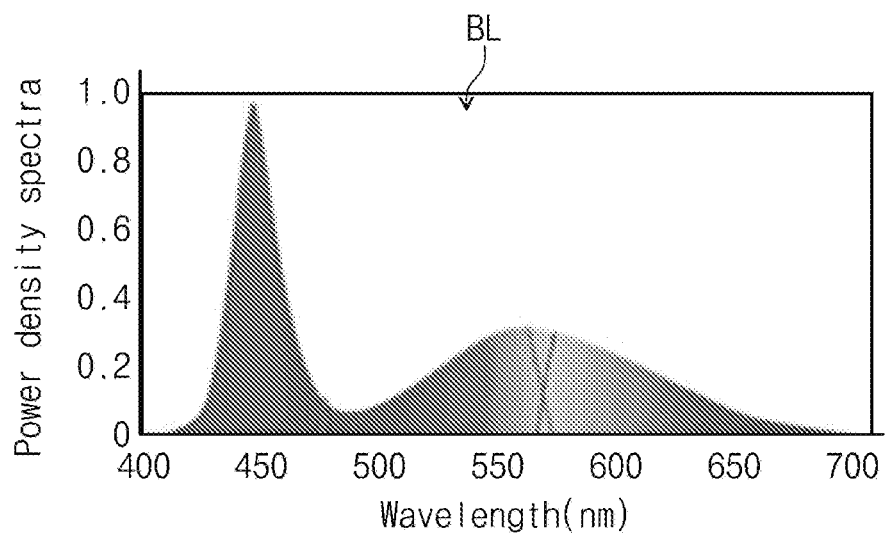
FIG. 3A is a view illustrating the spectrum of backlight shown in FIG. 2.
Figure 3B:
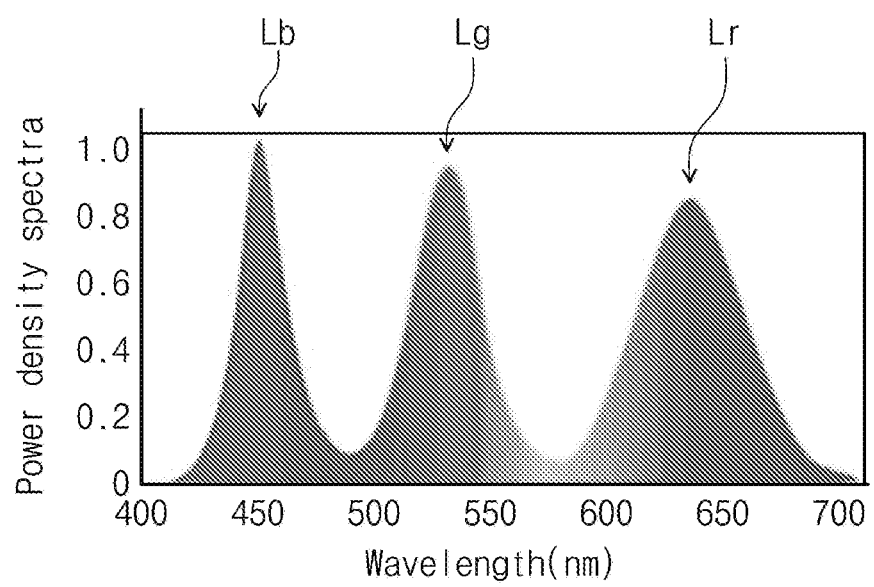
FIG. 3B is a view illustrating the spectrums of blue light, green light, and red light shown in FIG. 2.

FIG. 3A is a view illustrating the spectrum of a backlight shown in FIG. 2 and FIG. 3B is a view illustrating the spectrums of a blue light, a red light, and a red light shown in FIG. 2.

Further referring to FIGS. 3A and 3B, the spectrum of the backlight BL has two peaks corresponding to a blue color and a yellow color. The spectrum of the light (hereinafter referred to as display light) obtained by combining the blue light Lb, the green light Lg, and the red light Lr has three peaks corresponding to a blue color, a green color, and a red color. Especially, it is checked that a component corresponding to yellow in the spectrum of the display light is reduced drastically. Such the spectrum of the display light results from the resonances of the first to third optical cavities 110B, 110G, and 110R. As a result, when the display device 1000 displays an image through the display light, the color reproducibility of the display device 1000 may be improved effectively. Additionally, since the Full Width Half Maximum ("FWHM") of the blue light Lb, the green light Lg, and the red light Lr is controlled accurately by the resonance unit 110, the color reproducibility of the display device 1000 may be improved effectively.

Figure 4:
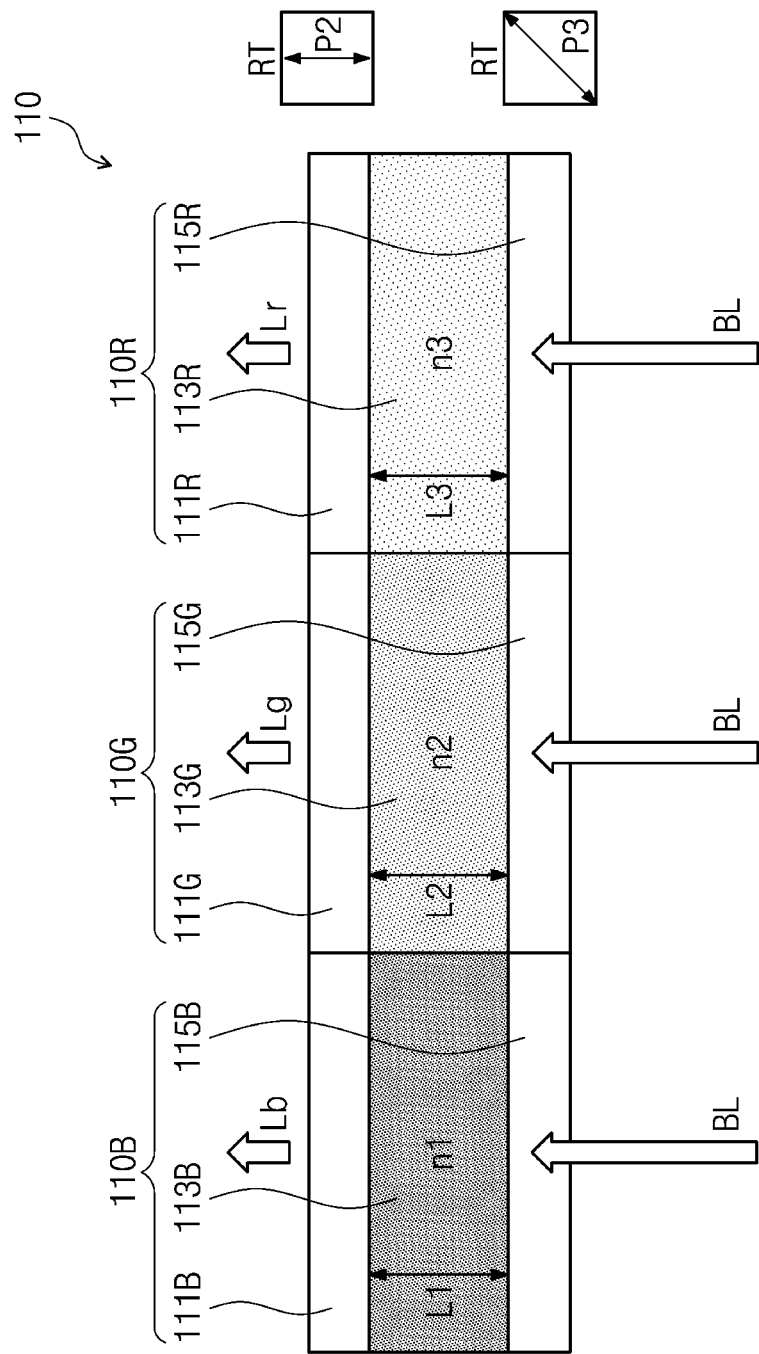
FIG. 4 is a sectional view of an exemplary embodiment of a resonance unit according to the invention.

FIG. 4 is a sectional view of a resonance unit according to an exemplary embodiment of the invention.

Referring to FIG. 4, according to an exemplary embodiment of the invention, each of the first to third optical cavities 110R, 110G, and 110B may include a reflective polarization unit having the second polarization axis P2 and a facing reflective unit facing the reflective polarization unit.

According to an exemplary embodiment of the invention, each of the reflective polarization unit and the facing reflective unit, for example, may be a reflective polarizer. The reflective polarizer passes a light polarized in parallel to a transmission axis and reflects most of a light parallel to a reflective axis perpendicular to the transmission axis. In an exemplary embodiment, the reflective polarizer, for example, may include a metal wire (or one dimensional grid) extending in parallel to the absorption axis, for example.

The first optical cavity 110B includes a first reflective polarization unit 111B, a first dielectric layer 113B, and a first facing reflective unit 115B.

The first facing reflective unit 115B may have a third polarization axis P3. The third polarization axis P3, for example, may be parallel to the polarization plane RT and may be different from the second polarization axis P2. The third polarization axis P3 may define an acute angle with the second polarization axis P2. In an exemplary embodiment, an angle defined by the third polarization axis P3 and the second polarization axis P2, for example, may be 45 degree) (°.

The first facing reflective unit 115B may pass a light polarized in parallel to the third polarization axis P3 and reflect a light polarized perpendicular to the third polarization axis P3.

According to an exemplary embodiment of the invention, the first reflective polarization unit 111B is disposed on the first facing reflective unit 115B and has the second polarization axis P2. The first reflective polarization unit 111B may pass a light polarized in parallel to the second polarization axis P2 and reflect a light polarized perpendicular to the second polarization axis P2.

The first dielectric layer 113B may have a first refractive index n1. The first dielectric layer 113B may be transparent and may include a single layer or a multi layer including an organic layer or an inorganic layer. The first dielectric layer 113B may be disposed between the first reflective polarization unit 111B and the first facing reflective unit 115B.

According to an exemplary embodiment of the invention, the first reflective polarization unit 111B and the first facing reflective unit 115B may be defined by two reflective surfaces of the first optical cavity 110B, and a thickness of the first dielectric layer 113B may be defined by a first resonance distance L1 of the first optical cavity 110B.

The first optical cavity 110B has a first resonance frequency $f_1$ corresponding to a blue color. That is, the first optical cavity 110B may resonate the blue light Lb. The first resonance distance L1 and the first refractive index n1 of the first dielectric layer 113B may be defined to allow the blue light Lb to resonate between the first reflective polarization unit 111B and the first facing reflective unit 115B.

According to an exemplary embodiment of the invention, the first resonance distance L1 and the first refractive index n1 may satisfy $2 \cdot n1 \cdot f1 \cdot L1 = m \cdot c$ that is the resonance condition of the blue light Lb where m is a natural number greater than or equal to 1 and c is the speed of light in vacuum.

The second optical cavity 110G includes a second reflective polarization unit 111G, a second dielectric layer 113G, and a second facing reflective unit 115G.

Since the second reflective polarization unit 111G and the second facing reflective unit 115G are similar to the first reflective polarization unit 111B and the first facing reflective unit 115B, respectively, redundant descriptions are omitted.

The second dielectric layer 113G may have a second refractive index n2. The second dielectric layer 113G may be transparent and may include a single layer or a multi layer including an organic layer or an inorganic layer. The second dielectric layer 113G may be disposed between the second reflective polarization unit 111G and the second facing reflective unit 115G.

According to an exemplary embodiment of the invention, the second reflective polarization unit 111G and the second facing reflective unit 115G may be defined by two reflective surfaces of the second optical cavity 110G, and a thickness of the second dielectric layer 113G may be defined by the second resonance distance L2 of the second optical cavity 110G.

The second optical cavity 110G has a second resonance frequency f2 corresponding to a green color. That is, the second optical cavity 110G may resonate the green light Lg. The second resonance distance L2 and the second refractive index n2 of the second dielectric layer 113G may be defined to allow the green light Lg to resonate between the second reflective polarization unit 111G and the second facing reflective unit 115G.

According to an exemplary embodiment of the invention, the second resonance distance L2 and the second refractive index n2 may satisfy $2 \cdot n2 \cdot f2 \cdot L2 = m \cdot c$ that is the resonance condition of the green light Lg where m is a natural number greater than or equal to 1 and c is the speed of light in vacuum.

The third optical cavity 110R includes a third reflective polarization unit 111R, a third dielectric layer 113R, and a third facing reflective unit 115R.

Since the third reflective polarization unit 111R and the third facing reflective unit 115R are similar to the first reflective polarization unit 111B and the first facing reflective unit 115B, respectively, redundant descriptions are omitted.

The third dielectric layer 113R may have a third refractive index n3. The third dielectric layer 113R may be transparent and may include a single layer or a multi layer including an organic layer or an inorganic layer. The third dielectric layer 113R may be disposed between the third reflective polarization unit 111R and the third facing reflective unit 115R.

According to an exemplary embodiment of the invention, the third reflective polarization unit 111R and the third facing reflective unit 115R may be defined by two reflective surfaces of the third optical cavity 110R, and a thickness of the third dielectric layer 113R may be defined by a third resonance distance L3 of the third optical cavity 110R.

The third optical cavity 110R has a third resonance frequency f3 corresponding to a red color. That is, the third optical cavity 110R may resonate the red light Lr. The third resonance distance L3 and the third refractive index n3 of the third dielectric layer 113R may be defined to allow the red light Lr to resonate between the third reflective polarization unit 111R and the third facing reflective unit 115R.

According to an exemplary embodiment of the invention, the third resonance distance L3 and the third refractive index n3 may satisfy $2 \cdot n3 \cdot f3 \cdot L3 = m \cdot c$ that is the resonance condition of the red light Lr where m is a natural number greater than or equal to 1 and c is the speed of light in vacuum.

According to an exemplary embodiment of the invention, the first to third resonance distances L1 to L3 may be equal to one another and the first to third refractive indexes n1 to n3 may be different from one another. Since the first to third resonance distances L1 to L3 are equal to one another, the resonance conditions in the first to third optical cavities 110R, 110G, and 110B may be determined by the first to third refractive indexes n1 to n3.

According to an exemplary embodiment of the invention, although the first to third reflective polarization units 111B to 111R are illustrated and described as separate configurations, the invention is not limited thereto. According to an exemplary embodiment of the invention, the first to third reflective polarization units 111B to 111R may be formed in one body. That is, the first to third reflective polarization units 111B to 111R may be unitary with one another.

In the same manner, according to an exemplary embodiment of the invention, although the first to third facing reflective units 115B to 115R are illustrated and described as separate configurations, the invention is not limited thereto. According to an exemplary embodiment of the invention, the first to third facing reflective units 115B to 115R may be formed in one body.

Figure 5:
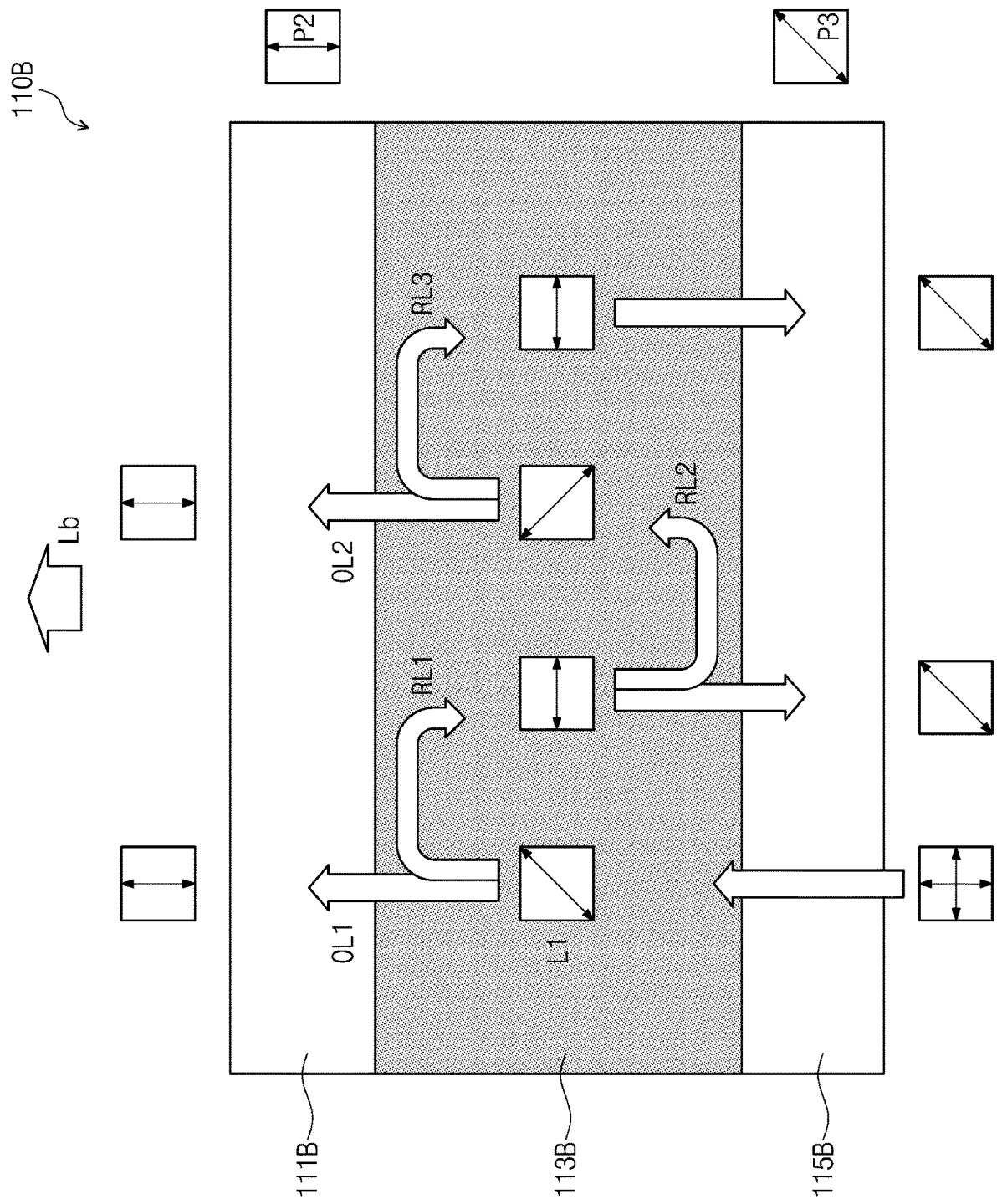
FIG. 5 is an enlarged sectional view of a first optical cavity shown in FIG. 4.

FIG. 5 is an enlarged sectional view of a first optical cavity shown in FIG. 4.

An operation of the first optical cavity 110B is described with reference to FIG. 5. In FIG. 5, for simplification of illustration, the reference symbol "RT" of the polarization plane (refer to FIG. 4) is omitted.

Referring to FIG. 5, the incident backlight BL is unpolarized light. A first light L1 parallel to the third polarization axis P3 in the backlight BL passes through the first facing reflective unit 115B. The first light L1 passes through the first dielectric layer 113B. A first output light OL1 parallel to the second polarization axis P2 in the first light L1 passes through the first reflective polarization unit 111B, and a first reflective light RL1 perpendicular to the second polarization axis P2 is reflected by the first reflective polarization unit 111B to face toward the first facing reflective unit 115B. A component parallel to the third polarization axis P3 in the first reflective light RL1 passes through the first facing reflective unit 115B and a second reflective light RL2 perpendicular to the third polarization axis P3 faces toward the first reflective polarization unit 111B again. A second output light OL2 parallel to the second polarization axis P2 in the second reflective light RL2 passes through the first reflective polarization unit 111B, and a third reflective light RL3 perpendicular to the second polarization axis P2 is reflected by the first reflective polarization unit 111B to face toward the first facing reflective unit 115B.

As such a process is repeated, output lights such as the first and second output lights OL1 and OL2 may be combined toward the upper side of the first reflective polarization unit 111B and may be outputted toward an upper side as the blue light Lb. Additionally, since the light reflected by the first reflective polarization unit 111B is reflected by the first facing reflective unit 115B again and its portion passes through the first reflective polarization unit 111B, the optical efficiency of the first optical cavity 110B may be improved.

The FWHM of the spectrum of the blue light Lb and the color coordinates and the optical efficiency of the blue light Lb may be determined by the intensity of a resonance generated from the first optical cavity 110B. As the intensity of resonance increases, the FWHM of the blue light Lb may become smaller and the optical efficiency may become reduced, and as the intensity of resonance decreases, the FWHM of the blue light Lb may become larger and the optical efficiency may be become increased. According to an exemplary embodiment of the invention, the second and third polarization axes P2 and P3 are not perpendicular and form 45°, for example. Accordingly, in comparison to a conventional resonance structure (for example, an optical cavity having two reflective surfaces that reflect light regardless of polarized light), a reflectivity between the reflective surfaces of the first optical cavity 110B is not so great and the intensity of a resonance of the blue light Lb may become smaller. As a result, in comparison to a conventional resonance structure of the blue light Lb, FWHM is large relatively, and optical efficiency may become large relatively.

Additionally, since the first reflective polarization unit 131B performs a lower polarizing plate of a general liquid crystal panel, an additional lower polarizing plate may be omitted.

Operations of the second and third optical cavities 110G and 110R (refer to FIG. 4) are similar to an operation of the first optical cavity 110B. Descriptions for operations of the second and third optical cavities 110G and 110R are replaced with descriptions for an operation of the first optical cavity 110B, and their specific descriptions are omitted.

Figure 6:
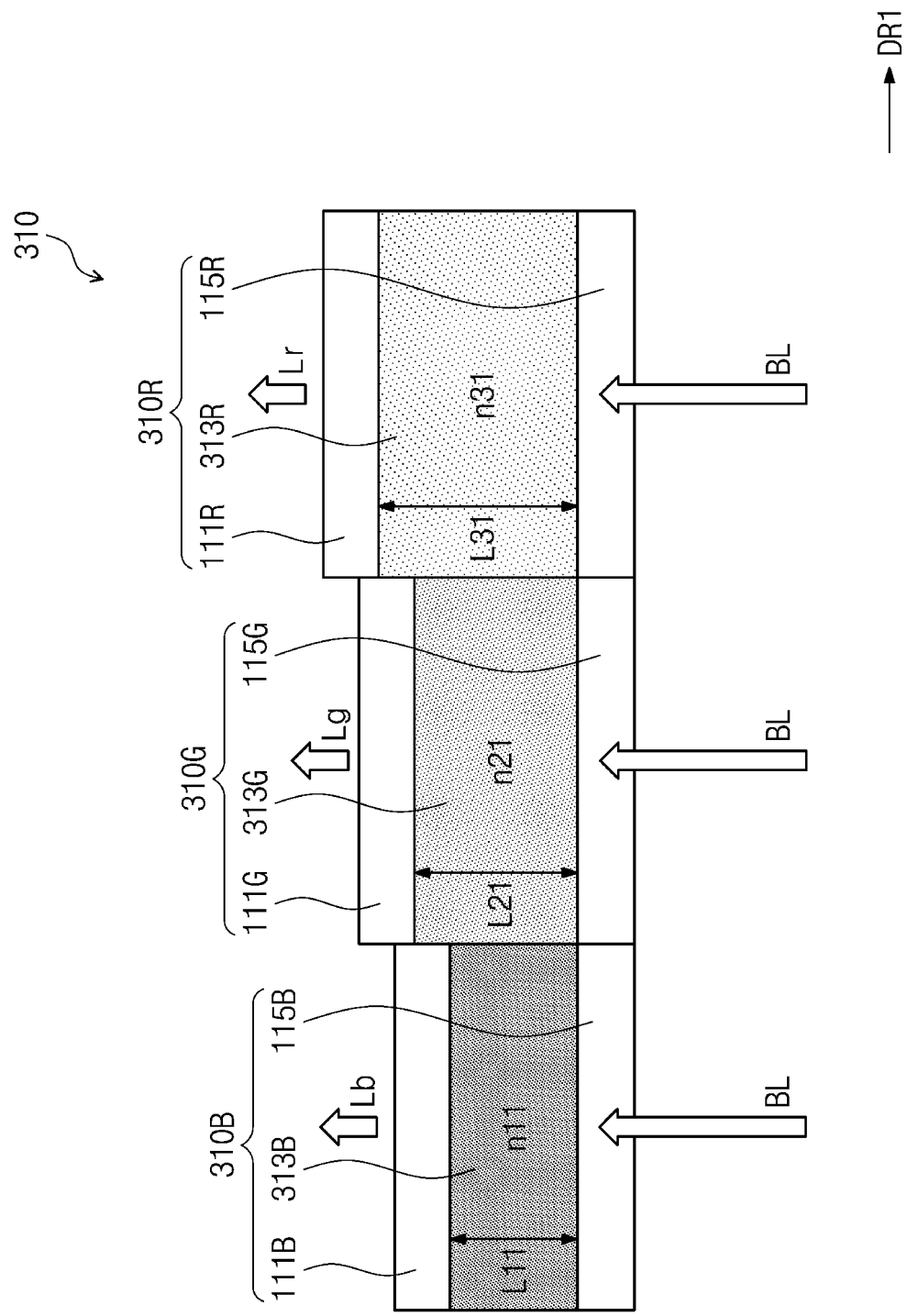
FIG. 6 is a sectional view of an exemplary embodiment of a resonance unit according to the invention.

FIG. 6 is a sectional view of a resonance unit according to an exemplary embodiment of the invention.

Referring to FIG. 6, according to an exemplary embodiment of the invention, a resonance unit 310 includes first to third optical cavities 310B, 310G, and 310R.

The first optical cavity 310B includes the first reflective polarization unit 111B, the first facing reflective unit 115B, and a first dielectric layer 313B. Except that the first optical cavity 310B includes the first dielectric layer 313B instead of the first dielectric layer 113B (refer to FIG. 4), the first optical cavity 310B is identical to the first optical cavity 110B (refer to FIG. 4) and thus overlapping descriptions are omitted.

According to an exemplary embodiment of the invention, the first reflective polarization unit 111B and the first facing reflective unit 115B may be defined by two reflective surfaces of the first optical cavity 310B, and a thickness of the first dielectric layer 313B may be defined by a first resonance distance L11 of the first optical cavity 310B.

The first optical cavity 310B has the first resonance frequency f1 corresponding to a blue color. According to an exemplary embodiment of the invention, the first resonance distance L11 and the first refractive index n11 of the first dielectric layer 313B may satisfy $2 \cdot n11 \cdot f1 \cdot L11 = mc$ that is the resonance condition of the blue light Lb where m is a natural number greater than or equal to 1 and c is the speed of light in vacuum.

The second optical cavity 310G includes the second reflective polarization unit 111G, the second facing reflective unit 115G, and a second dielectric layer 313G. Except that the second optical cavity 310G includes the second dielectric layer 313G instead of the second dielectric layer 113G (refer to FIG. 4), the second optical cavity 310G is identical to the second optical cavity 110G (refer to FIG. 4) and thus overlapping descriptions are omitted.

According to an exemplary embodiment of the invention, the second reflective polarization unit 111G and the second facing reflective unit 115G may be defined by two reflective surfaces of the second optical cavity 310G, and a thickness of the second dielectric layer 313G may be defined by the second resonance distance L21 of the second optical cavity 310G.

The second optical cavity 310G has the second resonance frequency f2 corresponding to a green color. According to an exemplary embodiment of the invention, the second resonance distance L21 and the second refractive index n21 of the second dielectric layer 313G may satisfy $2 \cdot n21 \cdot f2 \cdot L21 = m \cdot c$ that is the resonance condition of the green light Lg where m is a natural number greater than or equal to 1 and c is the speed of light in vacuum.

The third optical cavity 310R includes the third reflective polarization unit 111R, the third facing reflective unit 115G, and a third dielectric layer 313R. Except that the third optical cavity 310R includes the third dielectric layer 313R instead of the third dielectric layer 113R (refer to FIG. 4), the third optical cavity 310R is identical to the third optical cavity 110R (refer to FIG. 4) and thus overlapping descriptions are omitted.

According to an exemplary embodiment of the invention, the third reflective polarization unit 111R and the third facing reflective unit 115R may be defined by two reflective surfaces of the third optical cavity 310R, and a thickness of the third dielectric layer 313R may be defined by a third resonance distance L31 of the third optical cavity 310R.

The third optical cavity 310R has the third resonance frequency f3 corresponding to a red color. According to an exemplary embodiment of the invention, the third resonance distance L31 and the third refractive index n31 of the third dielectric layer 313R may satisfy 2·n31·f3·L31=m·c that is the resonance condition of the green light Lr where m is a natural number greater than or equal to 1 and c is the speed of light in vacuum.

According to an exemplary embodiment of the invention, although the first to third reflective polarization units 111B to 111R are illustrated and illustrated as separate configurations, the invention is not limited thereto. According to an exemplary embodiment of the invention, the first to third reflective polarization units 111B to 111R may be formed in one body. In the first to third reflective polarization units 111B to 111R, a step corresponding to a difference between the first to third resonance distances L11, L21, and L31 may be formed along the first direction DR1.

According to an exemplary embodiment of the invention, the first to third refractive indexes n11 to n31 may be equal to one another and the first to third resonance distances L11 to L31 may be different from one another. Since the first to third refractive indexes n11 to n31 are equal to one another, the resonance conditions in the first to third optical cavities 310R, 310G, and 310B may be determined by the first to third resonance distances L11 to L31.

Figure 7:
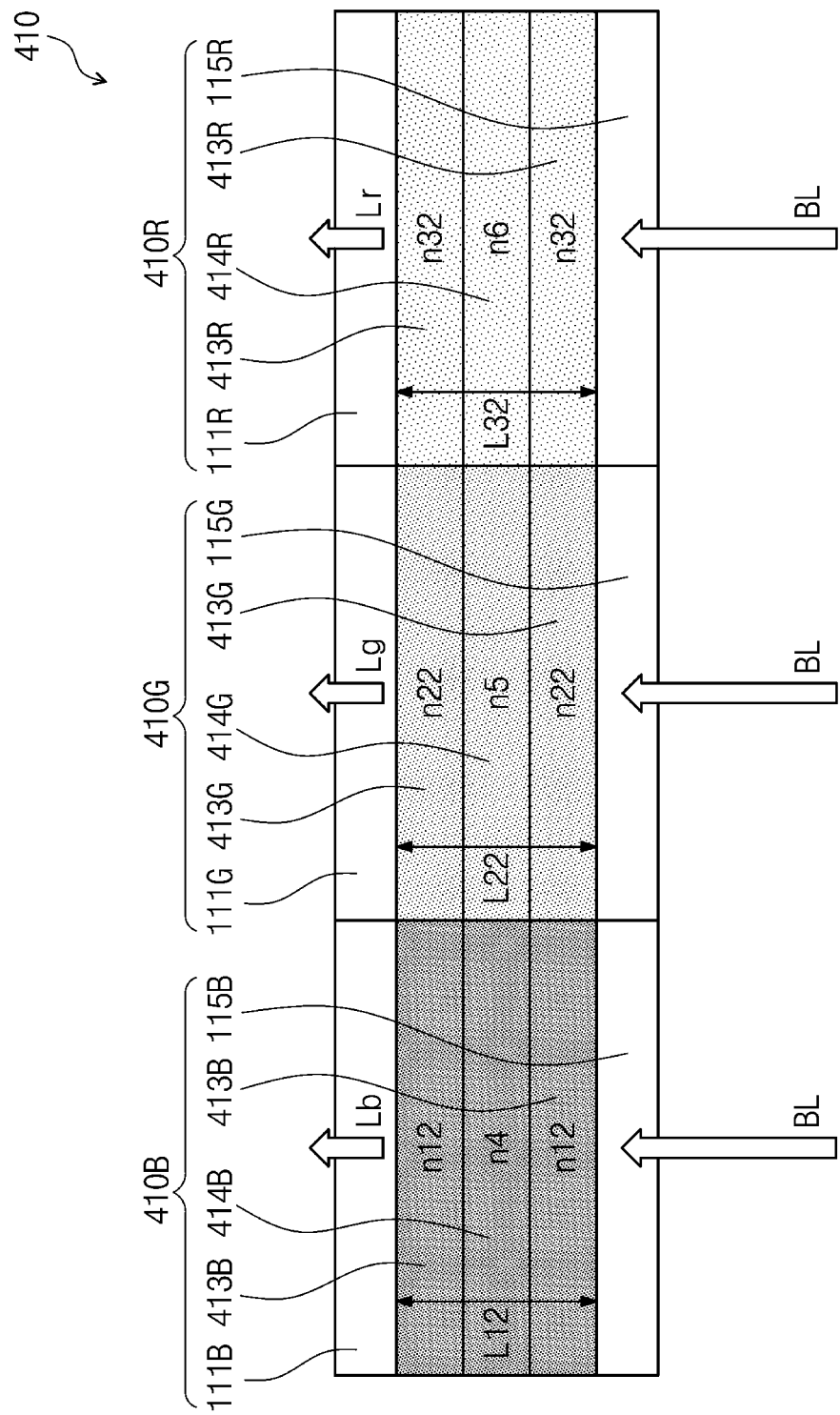
FIG. 7 is a sectional view of an exemplary embodiment of a resonance unit according to the invention.

FIG. 7 is a sectional view of a resonance unit according to an exemplary embodiment of the invention.

Referring to FIG. 7, according to an exemplary embodiment of the invention, a resonance unit 410 includes first to third optical cavities 410B, 410G, and 410R.

The first optical cavity 410B includes the first reflective polarization unit 111B, the first facing reflective unit 115B, first dielectric layers 413B, and a first color conversion layer 414B. Except that the first optical cavity 410B includes the first dielectric layers 413B instead of the first dielectric layer 113B (refer to FIG. 4) and includes the first color conversion layer 414B, the first optical cavity 410B is identical to the first optical cavity 110B (refer to FIG. 4) and thus overlapping descriptions are omitted.

According to an illustrated exemplary embodiment of the invention, the first optical cavity 410B includes two first dielectric layers 413B. The two first dielectric layers 413B may be spaced apart vertically, and may respectively contact the first reflective polarization unit 111B and the first facing reflective unit 115B.

According to an exemplary embodiment of the invention, the first color conversion layer 414B includes blue color conversion particles for converting the backlight BL to the blue light Lb. The blue color conversion particles, for example, may be excited by the backlight BL, and the excited blue color conversion particles may generate the blue light Lb. In an exemplary embodiment, the blue color conversion particles, for example, may be blue fluorescent substance or blue Quantum-Dot.

According to an exemplary embodiment of the invention, the first color conversion layer 414B may be disposed between the two first dielectric layers 413B. However, the invention is not limited thereto. As long as the first color conversion layer 414B and the first dielectric layer 413B are disposed between the first reflective polarization unit 111B and the first facing reflective unit 115B, the numbers of the first dielectric layers 413B and the first color conversion layers 414B or the stacking order of the first dielectric layers 413B and the first color conversion layers 414B may be modified variously.

According to an exemplary embodiment of the invention, the first reflective polarization unit 111B and the first facing reflective unit 115B may be defined by two reflective surfaces of the first optical cavity 410B, and the sum of thicknesses of the two first dielectric layers 413B and the first color conversion layer 414B may be defined by a first resonance distance L12 of the first optical cavity 410B.

The first optical cavity 410B has the first resonance frequency f1 corresponding to a blue color. The first resonance distance L12 and the first refractive index n12 of the first dielectric layer 413B and the refractive index n4 of the first color conversion layer 414B may be defined to allow the blue light Lb to resonate between the first reflective polarization unit 111B and the first facing reflective unit 115B.

The second optical cavity 410G includes the second reflective polarization unit 111G, the second facing reflective unit 115G, second dielectric layers 413G, and a second color conversion layer 414G. Except that the second optical cavity 410G includes the second dielectric layers 413G instead of the second dielectric layer 113G (refer to FIG. 4) and includes the second color conversion layer 414G, the second optical cavity 410G is identical to the second optical cavity 110G (refer to FIG. 4) and thus overlapping descriptions are omitted.

According to an illustrated exemplary embodiment of the invention, the second optical cavity 410G includes two second dielectric layers 413G. The two first dielectric layers 413G may be spaced apart vertically, and may respectively contact the second reflective polarization unit 111G and the second facing reflective unit 115G.

According to an exemplary embodiment of the invention, the second color conversion layer 414G includes green color conversion particles for converting the backlight BL to the green light Lg. The green color conversion particles, for example, may be excited by the backlight BL, and the excited green color conversion particles may generate the green light Lg. In an exemplary embodiment, the green color conversion particles, for example, may be green fluorescent substance or green Quantum-Dot.

According to an exemplary embodiment of the invention, the second color conversion layer 414G may be disposed between the two second dielectric layers 413G. However, the invention is not limited thereto. As long as the second color conversion layer 414G and the second dielectric layer 413G are disposed between the second reflective polarization unit 111G and the second facing reflective unit 115G, the numbers of the second dielectric layers 413G and the second color conversion layers 414G or the stacking order of the second dielectric layers 413G and the second color conversion layers 414G may be modified variously.

According to an exemplary embodiment of the invention, the second reflective polarization unit 111G and the second facing reflective unit 115G may be defined by two reflective surfaces of the second optical cavity 410G, and the sum of thicknesses of the two second dielectric layers 413G and the second color conversion layer 414G may be defined by a second resonance distance L22 of the second optical cavity 410G.

The second optical cavity 410G has the second resonance frequency f2 corresponding to a green color. The second resonance distance L22 and the second refractive index n22 of the second dielectric layer 413G and the refractive index n5 of the second color conversion layer 414G may be defined to allow the green light Lg to resonate between the second reflective polarization unit 111G and the second facing reflective unit 115G.

The third optical cavity 410R includes the third reflective polarization unit 111R, the third facing reflective unit 115R, third dielectric layers 413R, and a third color conversion layer 414R. Except that the third optical cavity 410R includes the third dielectric layers 413R instead of the third dielectric layer 113R (refer to FIG. 4) and includes the third color conversion layer 414R, the third optical cavity 410R is identical to the third optical cavity 110R (refer to FIG. 4) and thus overlapping descriptions are omitted.

According to an illustrated exemplary embodiment of the invention, the third optical cavity 410R includes two third dielectric layers 413R. The two third dielectric layers 413R may be spaced apart vertically, and may respectively contact the third reflective polarization unit 111R and the third facing reflective unit 115R.

According to an exemplary embodiment of the invention, the third color conversion layer 414R includes red color conversion particles for converting the backlight BL to the red light Lr. The red color conversion particles, for example, may be excited by the backlight BL, and the excited red color conversion particles may generate the red light Lr. In an exemplary embodiment, the red color conversion particles, for example, may be red fluorescent substance or red Quantum-Dot.

According to an exemplary embodiment of the invention, the third color conversion layer 414R may be disposed between the two third dielectric layers 413R. However, the invention is not limited thereto. As long as the third color conversion layer 414R and the third dielectric layer 413R are disposed between the third reflective polarization unit 111R and the third facing reflective unit 115G, the numbers of the third dielectric layers 413R and the third color conversion layers 414R or the stacking order of the third dielectric layers 413R and the third color conversion layers 414R may be modified variously.

According to an exemplary embodiment of the invention, the third reflective polarization unit 111R and the third facing reflective unit 115R may be defined by two reflective surfaces of the third optical cavity 410R, and the sum of thicknesses of the two third dielectric layers 413R and the third color conversion layer 414R may be defined by a third resonance distance L32 of the third optical cavity 410R.

The third optical cavity 410R has the third resonance frequency f3 corresponding to a red color. The third resonance distance L32 and the third refractive index n32 of the third dielectric layer 413R and the refractive index n6 of the third color conversion layer 414R may be defined to allow the red light Lr to resonate between the third reflective polarization unit 111R and the third facing reflective unit 115R.

Since the first to third optical cavities 410R, 410G, and 410B include the blue, green, and red color conversion particles, respectively, the color purity and color reproducibility of the blue, green, and red lights Lb, Lg, and Lr provided from the resonance unit 410 may be improved.

According to an exemplary embodiment of the invention, the first to third resonance distances L12 to L32 may be equal to one another and the first to third refractive indexes n12 to n32 may be different from one another and the refractive indexes n4 to n6 of the first to third color conversion layers 414B, 414G, and 414R may be different from one another. Since the first to third resonance distances L12 to L32 are equal to one another, the resonance conditions in the first to third optical cavities 410R, 410G, and 410B may be determined by the first to third refractive indexes n12 to n32 of the first to third dielectric layers 413B, 413G, and 413R, respectively, or the refractive indexes n4 to n6 of the first to third color conversion layers 414B, 414G, and 414R, respectively.

Figure 8:
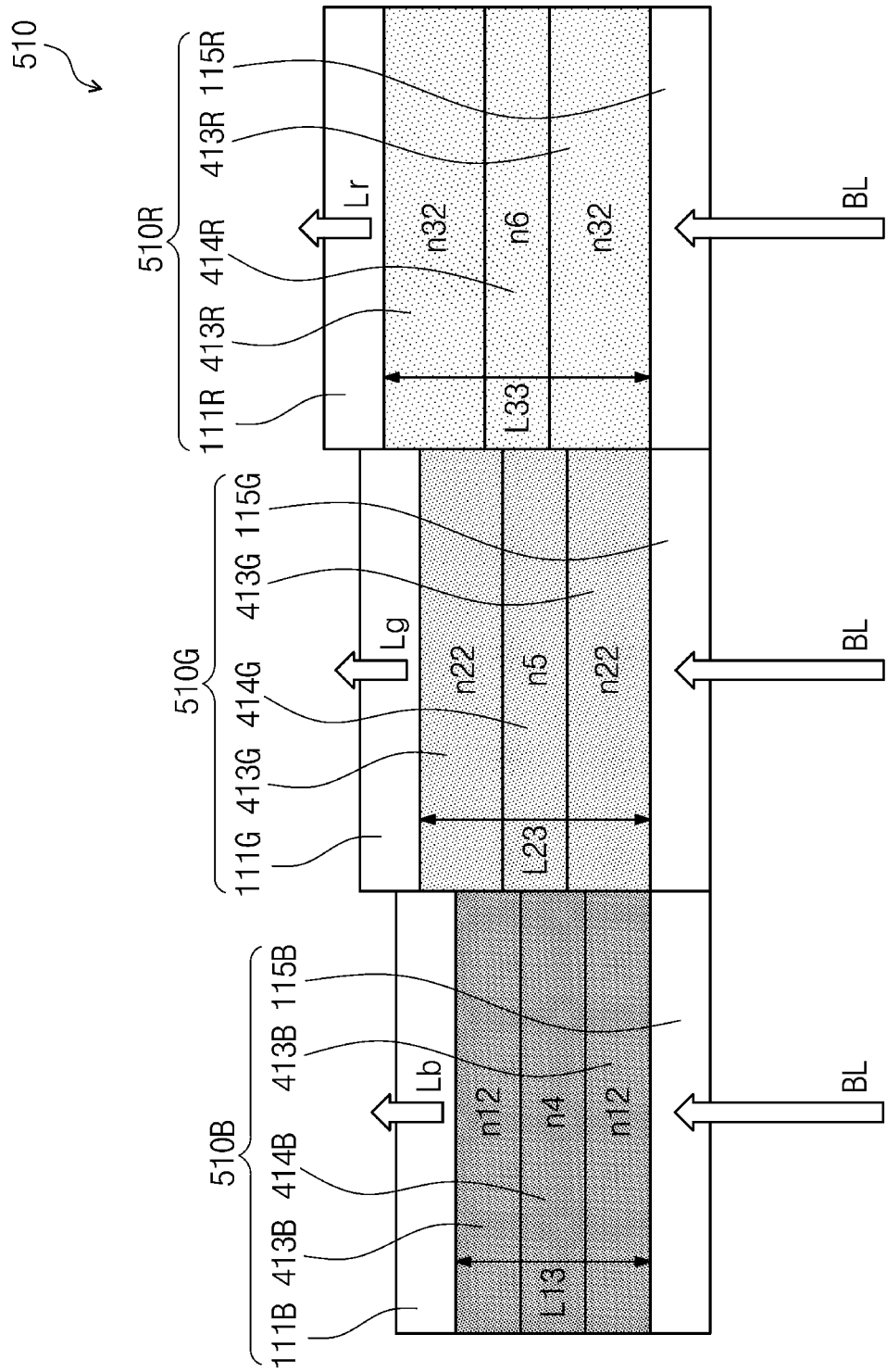
FIG. 8 is a sectional view of an exemplary embodiment of a resonance unit according to the invention.

FIG. 8 is a sectional view of a resonance unit according to an exemplary embodiment of the invention.

Referring to FIG. 8, according to an exemplary embodiment of the invention, a resonance unit 510 includes first to third optical cavities 510B, 510G, and 510R.

Except that the first optical cavity 510B includes the first resonance distance L13 instead of the first resonance distance L12 (refer to FIG. 7), the first optical cavity 510B is identical to the first optical cavity 410B (refer to FIG. 7) and thus overlapping descriptions are omitted.

According to an exemplary embodiment of the invention, the first reflective polarization unit 111B and the first facing reflective unit 115B may be defined by two reflective surfaces of the first optical cavity 510B, and the sum of thicknesses of the two first dielectric layers 413B and the first color conversion layer 414B may be defined by a first resonance distance L13 of the first optical cavity 510B.

Similarly, except that the second optical cavity 510G includes the second resonance distance L23 instead of the second resonance distance L22 (refer to FIG. 7), the second optical cavity 510G is identical to the second optical cavity 410G (refer to FIG. 7) and thus overlapping descriptions are omitted.

According to an exemplary embodiment of the invention, the second reflective polarization unit 111G and the second facing reflective unit 115G may be defined by two reflective surfaces of the second optical cavity 510G, and the sum of thicknesses of the two second dielectric layers 413G and the second color conversion layer 414G may be defined by a second resonance distance L23 of the second optical cavity 510G.

Similarly, except that the third optical cavity 510R includes the third resonance distance L33 instead of the third resonance distance L32 (refer to FIG. 7), the third optical cavity 510R is identical to the third optical cavity 410R (refer to FIG. 7) and thus overlapping descriptions are omitted.

According to an exemplary embodiment of the invention, the third reflective polarization unit 111R and the third facing reflective unit 115R may be defined by two reflective surfaces of the third optical cavity 510R, and the sum of thicknesses of the two third dielectric layers 413R and the third color conversion layer 414R may be defined by a third resonance distance L33 of the third optical cavity 510R.

According to an exemplary embodiment of the invention, the first to third refractive indexes n12 to n32 may be equal to one another and the refractive indexes n4 to n6 of the first to third color conversion layers 414B to 414R may be equal to one another. Accordingly, the resonance conditions in the first to third optical cavities 510R, 510G, and 510B may be determined by the first to third resonance distances L13 to L33.

Figure 9:
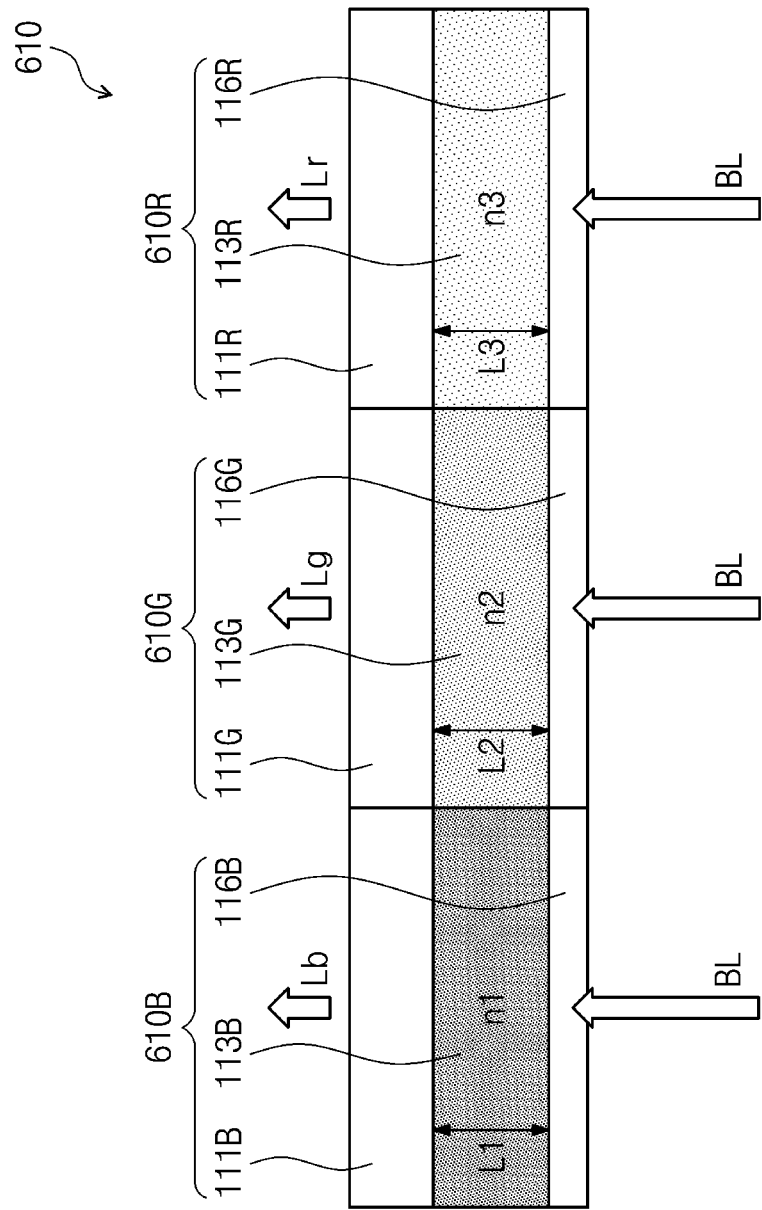
FIG. 9 is a sectional view of an exemplary embodiment of a resonance unit according to the invention.

FIG. 9 is a sectional view of a resonance unit according to an exemplary embodiment of the invention.

Referring to FIG. 9, a resonance unit 610 includes first to third optical cavities 610R, 610G, and 610B.

Referring to FIG. 9, according to an exemplary embodiment of the invention, the reflective polarization unit of each of the first to third optical cavities 610R, 610G, and 610B may be the reflective polarizer and each facing reflective unit may be a semi-transparent layer.

The semi-transparent layer may be a single layer or a multi thin layer for reflecting most of light. In an exemplary embodiment, the semi-transparent layer, for example, may be an optically thin metal layer or a dielectric mirror. The dielectric mirror may include dielectric layers that have different refractive indexes and are stacked alternately.

Each semi-transparent layer of the first to third optical cavities 610R, 610G, and 610B may be disposed below a reflective polarization unit. However, the invention is not limited thereto, and each semi-transparent layer of the first to third optical cavities 610R, 610G, and 610B may be disposed on a reflective polarization unit.

Except that the first to third optical cavities 610R, 610G, and 610B include first to third semi-transparent layers 116B, 116G, and 116R instead of the first to third facing reflective units 115B, 115G, and 115R (refer to FIG. 4), the first to third optical cavities 610R, 610G, and 610B are identical to the first to third optical cavities 110R, 110G, and 110B (refer to FIG. 4) and thus overlapping descriptions are omitted.

According to an exemplary embodiment of the invention, the first reflective polarization unit 111B and the first semi-transparent layer 116B may be defined by two reflective surfaces of the first optical cavity 610B, and a thickness of the first dielectric layer 113B may be defined by the first resonance distance L1 of the first optical cavity 610B.

The first optical cavity 610B has the first resonance frequency f1 corresponding to a blue color. That is, the first optical cavity 610B may resonate the blue light Lb.

According to an exemplary embodiment of the invention, the second reflective polarization unit 111G and the second semi-transparent layer 116G may be defined by two reflective surfaces of the second optical cavity 610G, and a thickness of the second dielectric layer 113G may be defined by the second resonance distance L2 of the second optical cavity 610G.

The second optical cavity 610G has the second resonance frequency f2 corresponding to a green color. That is, the second optical cavity 610G may resonate the green light Lg.

According to an exemplary embodiment of the invention, the third reflective polarization unit 111R and the third semi-transparent layer 116R may be defined by two reflective surfaces of the third optical cavity 610R, and a thickness of the third dielectric layer 113R may be defined by the third resonance distance L3 of the third optical cavity 610R.

The third optical cavity 610R has the third resonance frequency f3 corresponding to a red color. That is, the third optical cavity 610R may resonate the red light Lr.

Since the first to third semi-transparent layers 116B, 116G, and 116R include a single layer or a multi thin layer, the structure of the resonance unit 610 becomes simple and its manufacturing processing costs may be reduced.

Figure 10:
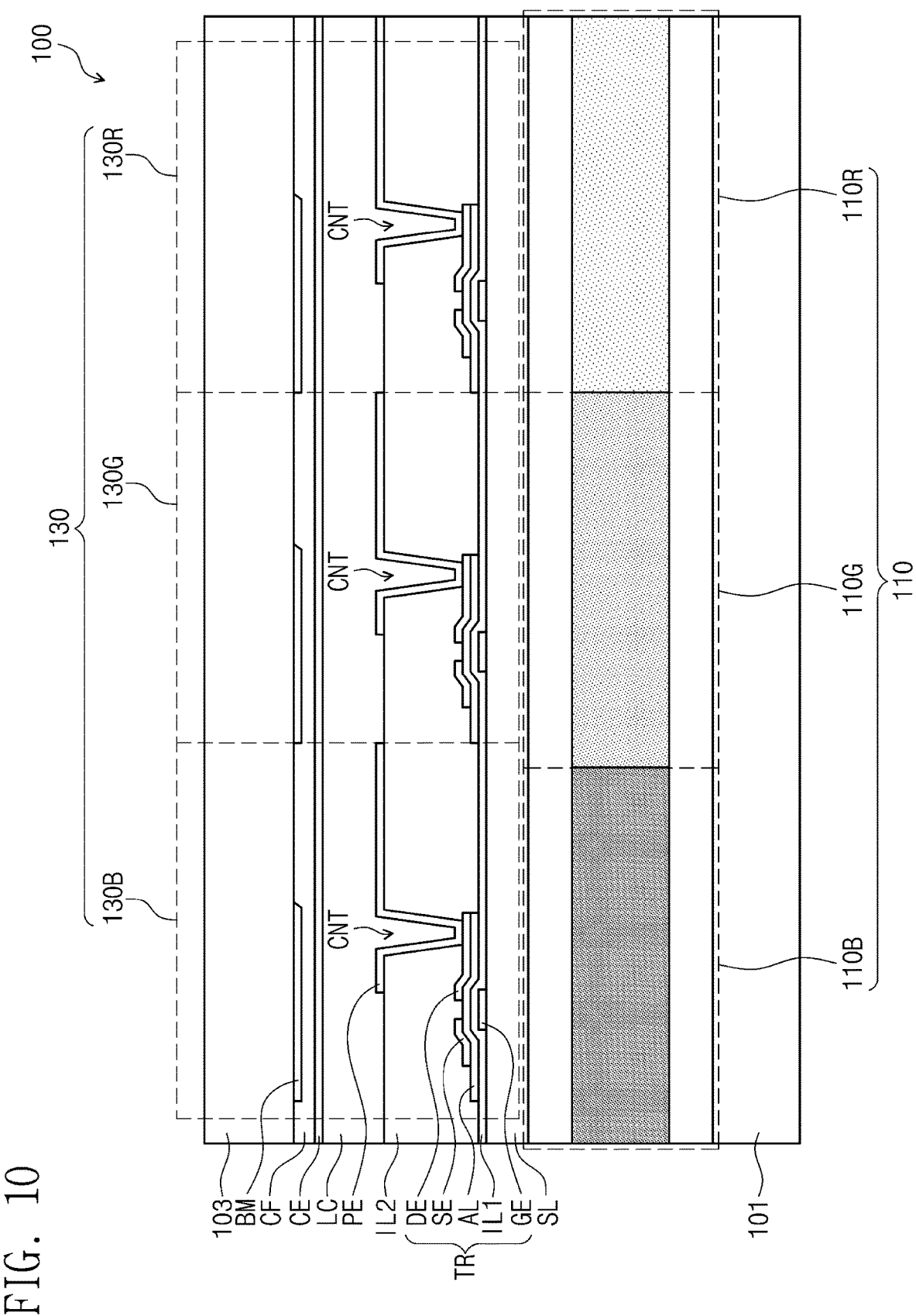
FIG. 10 is a sectional view of an exemplary embodiment of another display panel according to the invention.

FIG. 10 is a sectional view of another display panel according to an exemplary embodiment of the invention.

According to an exemplary embodiment of the invention, the display panel 100 includes a separation layer SL, a first insulating layer IL1, a second insulating layer IL2, a pixel electrode PE, and a transistor TR.

The separation layer SL may be disposed on the resonance unit 110 and may separate the resonance unit 110 from the pixel 130.

The transistor TR includes a gate electrode GE, a first insulating layer IL1, a semiconductor layer AL, a source electrode SE, and a drain electrode DE. The gate electrode GE is disposed on the separation layer SL. The semiconductor layer AL is disposed on the gate electrode GE with the first insulating layer IL1 therebetween. The source electrode SE contacts the semiconductor layer AL and the drain electrode DE is spaced from the source electrode SE and contacts the semiconductor layer AL.

The second insulating layer IL2 covers the transistor TR and the first insulating layer IL'. A contact hole CNT recessed toward a lower side may be defined in the second insulating layer IL2. The top surface of the drain electrode DE is exposed by the contact hole CNT.

The pixel electrode PE is disposed at the second insulating layer IL2 and the contact hole CNT, and is electrically connected to the top surface of the drain electrode DE exposed through the contact hole CNT. In an exemplary embodiment, the pixel electrode PE may include a transparent metal oxide, for example, indium tin oxide ("ITO"), indium zinc oxide ("IZO"), and indium tin zinc oxide ("ITZO").

The display panel 100 includes a color filter CF, a black matrix BM, a common electrode CE, and a liquid crystal layer LC.

The black matrix BM is disposed on the upper substrate 103 in correspondence to a light screening area (not shown). Light leakage may occur in the light screening area. The black matrix BM is provided in the light screening area to prevent the light leakage.

The color filter CF is disposed on the upper substrate 103, and filters a component corresponding to a specific wavelength of light to implement color. According to an exemplary embodiment of the invention, it is disclosed that the color filter CF is provided to the upper substrate 103 but the invention is not limited thereto, and the color filter CF may be provided to the upper substrate 101 or may be omitted.

The common electrode CE may be disposed on the color filter CF. The common electrode CE may include a transparent conductive material. In an exemplary embodiment, the common electrode CE may include a transparent metal oxide, for example, ITO, IZO, and ITZO.

The liquid crystal layer LC is disposed between the lower substrate 101 and the upper substrate 103 and includes liquid crystal molecules having dielectric anisotropy and optical anisotropy.

Each of the blue, green, and red sub pixels 130B, 130G, and 130R may include the transistor TR, the pixel electrode PE, a liquid crystal layer LC, the common electrode CE, and the color filter CF.

The resonance unit 110 including the first to third optical cavities 110R, 110G, and 110B may be disposed below the blue, green, and red sub pixels 130B, 130G, and 130R. The first to third optical cavities 110R, 110G, and 110B may have one of the structures shown in FIGS. 4 to 9, for example.

Figure 11:
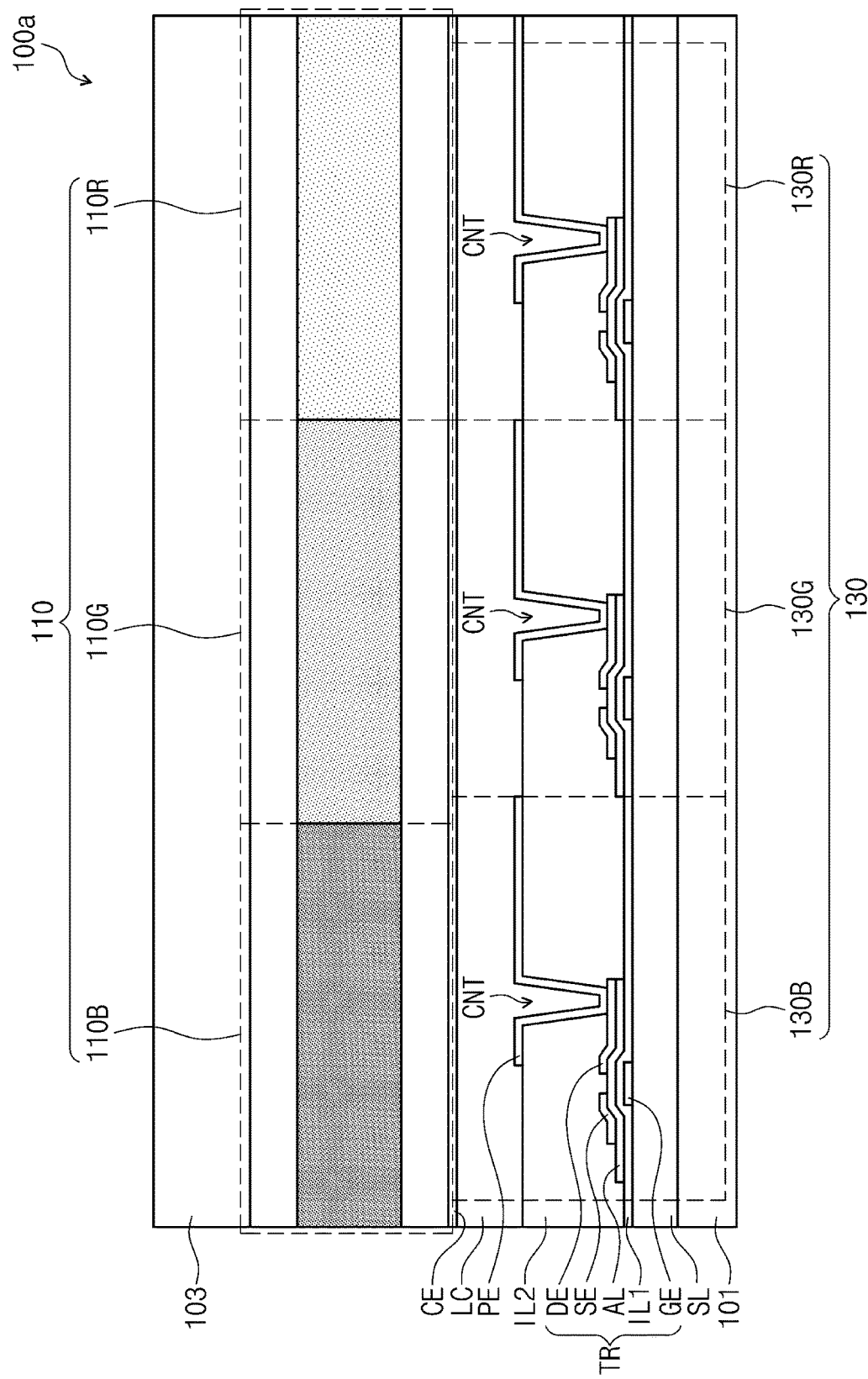
FIG. 11 is a sectional view of an exemplary embodiment of a display panel according to the invention.

FIG. 11 is a sectional view of a display panel according to an exemplary embodiment of the invention.

Except that the stacking order of the resonance unit 110 and the pixel 130 is different, a display panel 100a shown in FIG. 11 is identical to the display panel 100 (refer to FIG. 10) and thus overlapping descriptions are omitted.

Referring to FIG. 11, the resonance unit 110 may be disposed on the blue, green, and red sub pixels 130B, 130G, and 130R. The resonance unit 110, for example, may be disposed between the upper substrate 103 and the blue, green, and red sub pixels 130B, 130G, and 130R.

A display panel according to an exemplary embodiment of the invention includes a resonance unit for resonating backlight at a frequency corresponding to different colors and output color lights having different colors. Sub pixels of the display panel display images by using corresponding color lights. Since the FWHM of color light is controlled by the resonance unit, the color reproducibility of an image displayed on the display panel may be improved.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
a display panel comprising:
a lower substrate;
a resonance unit which is disposed on the lower substrate and comprises a first optical cavity and a second optical cavity;
a pixel which is disposed on the resonance unit and comprises:
a first sub pixel which displays a first color; and
a second sub pixel which displays a second color different from the first color, and
a polarizing plate disposed on the pixel and having a first polarization axis, and
a backlight unit which is disposed below the display panel and supplies backlight to the display panel,
wherein
the first optical cavity comprises a first reflective polarization unit having a second polarization axis perpendicular to the first polarization axis and a first facing reflective unit facing the first reflective polarization unit, and having a first resonance frequency corresponding to the first color;
the second optical cavity comprises a second reflective polarization unit having the second polarization axis and a second facing reflective unit facing the second reflective polarization unit, and has a second resonance frequency corresponding to the second color,
wherein each of the first and second facing reflective units has a third polarization axis different from the second polarization axis.

2. The display device of claim 1, wherein an angle between the third polarization axis and the second polarization axis is an acute angle.

3. The display device of claim 1, wherein a first resonance distance defined between the first reflective polarization unit and the first facing reflective unit is equal to a second resonance distance defined between the second reflective polarization unit and the second facing reflective unit.

4. The display device of claim 3, wherein
the first optical cavity further comprises a first dielectric layer disposed between the first reflective polarization unit and the first facing reflective unit;
the second optical cavity further comprises a second dielectric layer disposed between the second reflective polarization unit and the second facing reflective unit; and
a first refractive index of the first dielectric layer is different from a second refractive index of the second dielectric layer.

5. The display device of claim 4, wherein $2 \cdot n_1 \cdot f_1 \cdot L = m \cdot c$ and $2 \cdot n_2 \cdot f_2 \cdot L = m \cdot c$ are satisfied where $n_1$ is the first refractive index, $n_2$ is the second refractive index, $f_1$ is the first resonance frequency, $f_2$ is the second resonance frequency, m is a natural number greater than or equal to 1, c is a speed of light in vacuum, and L is the first and second resonance distances.

6. The display device of claim 1, wherein
the first optical cavity further comprises a first dielectric layer disposed between the first reflective polarization unit and the first facing refractive unit;
the second optical cavity further comprises a second dielectric layer disposed between the second reflective polarization unit and the second facing refractive unit; and
a first refractive index of the first dielectric layer is equal to a second refractive index of the second dielectric layer.

7. The display device of claim 6, wherein a first resonance distance defined between the first reflective polarization unit and the first facing reflective unit is different from a second resonance distance defined between the second reflective polarization unit and the second facing reflective unit.

8. The display device of claim 7, wherein $2 \cdot n \cdot f_1 \cdot L_1 = m \cdot c$ and $2 \cdot n \cdot f_2 \cdot L_2 = m \cdot c$ are satisfied where n is first and second refractive indexes, $f_1$ is the first resonance frequency, $f_2$ is the second resonance frequency, m is a natural number greater than or equal to 1, c is a speed of light in vacuum, $L_1$ is the first resonance distance, and $L_2$ is the second resonance distance.

9. The display device of claim 1, wherein the first optical cavity further comprises a first color conversion layer which converts the backlight to a first color light having the first color.

10. The display device of claim 9, wherein the first optical cavity further comprises two first dielectric layers disposed between the first reflective polarization unit and the first facing reflective unit, wherein the two first dielectric layers face each other with the first color conversion layer therebetween.

11. The display device of claim 10, wherein a sum of thicknesses of the two first dielectric layers and the first color conversion layer is substantially equal to a resonance distance of the first resonance frequency.

12. The display device of claim 9, wherein the second optical cavity further comprises a second color conversion layer which converts the backlight to a second color light having the second color.

13. The display device of claim 1, wherein each of the first and second facing reflective units includes a semi-transparent layer.

14. The display device of claim 13, wherein the first and second reflective polarization units are disposed between the first and second facing reflective units and the lower substrate.

15. The display device of claim 1, wherein the pixel further comprises a third sub pixel which displays a third color,
wherein the resonance unit is disposed between the third sub pixel and the backlight unit, and further comprises a third reflective polarization unit having the second polarization axis, a third facing reflective unit facing the third reflective polarization unit, and a third optical cavity having a third resonance frequency corresponding to the third color.

16. A display device comprising:
a display panel comprising:
a polarizing plate having a first polarization axis,
a pixel which is disposed on the polarizing plate and comprises a first sub pixel which displays a first color and a second sub pixel which displays a second color different from the first color, a resonance unit which is disposed on the pixel and includes a first optical cavity and a second optical cavity, and an upper substrate disposed on the resonance unit; and a backlight unit which is disposed below the display panel and supplies backlight to the display panel, wherein the first optical cavity comprises a first reflective polarization unit having a second polarization axis perpendicular to the first polarization axis and a first facing reflective unit facing the first reflective polarization unit, and has a first resonance frequency corresponding to the first color;

the second optical cavity comprises a second reflective polarization unit having the second polarization axis and a second facing reflective unit facing the second reflective polarization unit, and has a second resonance frequency corresponding to the second color, wherein each of the first and second facing reflective units comprises a third polarization axis different from the second polarization axis.

17. The display device of claim 16, wherein the first optical cavity further comprises a first color conversion layer which converts the backlight to a first color light having the first color.

18. The display device of claim 16, wherein each of the first and second facing reflective units includes a semi-transparent layer.

\* \* \* \* \*